Figure 1:
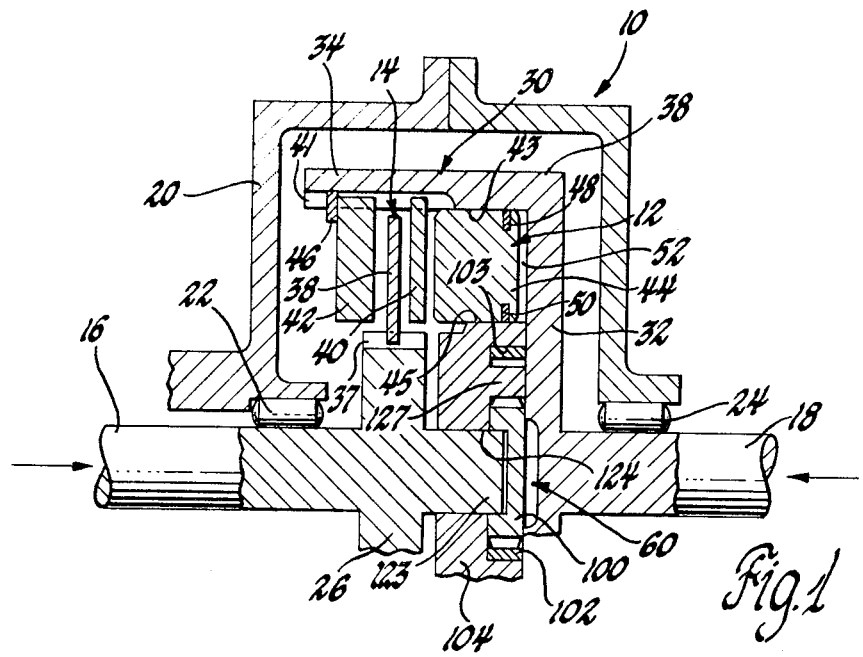

United States Patent [19]
Cheek

[11] 3,752,280
[45] Aug. 14, 1973

[54] CONSTANT SPEED DIFFERENTIAL FLUID CLUTCH

[75] Inventor: Forrest R. Cheek, Detroit, Mich.

[73] Assignee: General Motors Corporation, Detroit, Mich.

[22] Filed: Dec. 22, 1971

[21] Appl. No.: 210,682

[52] U.S. Cl............ 192/85 AA, 192/57, 192/103 F
[51] Int. Cl........................................ F16d 25/00
[58] Field of Search.................. 192/103 F, 85 AA, 192/57, 35, 104 F; 74/711

[56] References Cited
UNITED STATES PATENTS

| 3,437,186 | 4/1969 | Roper | 192/103 F X |
| 2,153,372 | 4/1939 | Hyde | 192/85 AA |
| 1,805,081 | 5/1931 | Drkal | 192/85 AA |
| 2,736,412 | 2/1956 | Livezey | 192/85 AA |
| 2,876,881 | 3/1959 | Parrett | 192/85 AA |
| 3,300,002 | 1/1967 | Roper | 192/57 X |

Primary Examiner—Benjamin W. Wyche
Attorney—E. W. Christen, R. L. Phillips et al.

[57] ABSTRACT

A fluid-pressure-operated slip clutch is operable to provide a slipping torque-pulse-isolating mechanical drive between two shafts. A positive displacement pump is operatively connected with the shafts to provide a pressure varying with the speed differential between the shafts. A clutch control valve is responsive to the varying pump pressure to supply fluid pressure to the slip clutch to maintain a substantially constant speed differential between the shafts.

1 Claim, 2 Drawing Figures

Patented Aug. 14, 1973

3,752,280

INVENTOR.
Forrest R. Cheek
BY
Ronald L. Phillips
ATTORNEY

CONSTANT SPEED DIFFERENTIAL FLUID CLUTCH

This invention relates to torque transmission devices and more particularly to torque transmission devices including a slipping mechanical clutch.

One of the advantages of a slipping mechanical clutch over a clutch which normally prevents a slip is that the slipping mechanical clutch isolates, from the mechanical components connected to the output member of a transmission, the short term pulses applied to the input member such as from a piston type internal combustion engine. Such torque pulse isolation obtains because the torque transmitted by a slip clutch is a function of a clutch capacity as effected by the controls for the clutch and not by the input torque. The torque pulses are not of sufficient duration to alter the control of the clutch so as to change its torque capacity and therefore short term torque pulses produce only momentary variations in the slip speed rather than in the output speed or torque.

According to the present invention, a fluid-pressure-operated slip clutch provides a slipping torque-pulse-isolating mechanical drive between two shafts. A positive displacement pump has its driving and reaction members operatively connected to the shafts to produce a pressure increasing with the speed differential between the shafts, the pump having valving to permit pump operation with torque transmission by either shaft in either direction of rotation. A pressure-responsive clutch control valve is normally biased to reduce the pressure applied to the clutch and the pressure provided by the pump opposes this bias to maintain a substantially constant speed differential between these shafts.

It is therefore an object of the present invention to provide, in a torque transmission device wherein a fluid-pressure operated slip clutch provides a slipping torque-pulse-isolating mechanical drive between a pair of shafts, a clutch control apparatus including a device for providing a signal varying with the speed differential between the shafts and a valve responsive to the speed differential signal to apply fluid pressure to the slip clutch to maintain a substantially constant speed differential between the shafts.

It is another object of the present invention to provide, in a torque transmission device wherein a fluid-pressure-operated slip clutch provides a slipping torque-pulse-isolating mechanical drive between a pair of shafts, a clutch control apparatus including a pump that develops fluid pressure varying with the speed differential between the shafts and a pressure responsive clutch control valve that is operated by the varying pump pressure to supply fluid pressure to the slip clutch to maintain a constant speed differential between the shafts.

Figure 2:
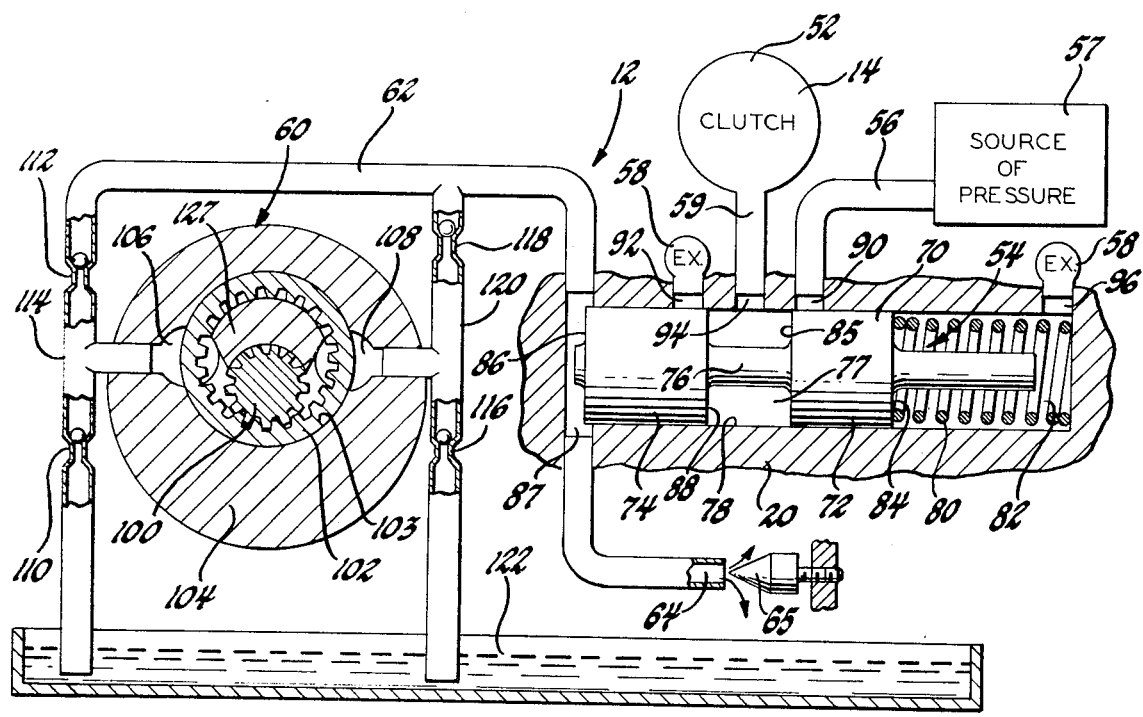

It is another object of the present invention to provide clutch control apparatus of the foregoing type for controlling the speed differential between the shafts of the torque transmission device wherein the pump is a positive displacement pump the driving and reaction members of which are operatively connected with the shafts and wherein the pump has valving to permit the pump to provide pressure varying with the speed differential between the shafts when either shaft transmits torque to the other in either direction of rotation These and other objects and features of the present invention will become more apparent from the following description taken in conjunction with the accompanying drawings wherein:

FIG. 1 is a longitudinal view partly in section of a torque transmission device incorporating clutch control apparatus provided in accordance with the present invention; and FIG. 2 is a view showing the clutch control apparatus of FIG. 1 partly in schematic and including a clutch control valve operated by pressure developed by a pump against a flow orifice.

With reference now to FIG. 1, there is shown a torque transmission device 10 as might be used to transmit torque from an internal combustion engine to the driving wheels of a vehicle and incorporating a clutch control apparatus 12 provided in accordance with the present invention and shown in greater detail in FIG. 2.

Transmission device 10 includes a slip clutch 14 controlled by apparatus 12 to provide a continuously slipping torque-pulse-isolating connection for transmitting torque between first and second torque transmission shafts 16 and 18 that are coaxially aligned in a stationary housing 20 and rotatably supported therein by respective bearings 22 and 24. Shaft 16 includes a hub 26 located in housing 20 intermediate the bearings 22 and 24 and shaft 18 includes an integral cylindrical member 30 located in housing 20 intermediate bearings 22 and 24 and having a radially extending wall 32 connected with a cylindrical drum 34 extending from the wall 32 axially towards shaft 16 about hub 26.

Clutch 14 includes annular plates 38 and 40 sandwiched between an annular clutch backplate 42 and an annular clutch apply piston 44, clutch plate 38 having internal teeth in sliding splined connection with splines 37 on the exterior of hub 26 and plate 40 having external teeth in sliding splined connection with splines 41 on the interior of drum 34. Backplate 42 is also in sliding splined connection with splines 41 and is retained thereon by a snap ring 46. Pressure apply piston 44 is mounted in an annular opening provided between the cylindrical interior 43 of drum 34 and the cylindrical exterior 45 of a pump housing described below and is sealed in this annular opening by seals 48 and 50, cylindrical member 30 and piston 44 thereby defining a clutch piston chamber 52 to which fluid pressure may be communicated.

As may be better understood in conjunction with FIG. 2, fluid pressure is applied to control the torque capacity of clutch 14 by clutch control apparatus 12 that includes a pressure-responsive clutch-control valve 54 for communicating fluid pressure with clutch piston chamber 52 through a clutch line 59. Fluid pressure is supplied from a pressure line 56 connected to receive fluid pressure from a suitable pressure source 57 and is exhausted to an exhaust line 58. Control apparatus 12 further includes a pump means 60 operatively connected between shafts 16 and 18 as described below to provide a pressure signal for operating clutch control valve 54, such signal varying with the speed differential between shafts 16 and 18. To provide this signal, pump means 60 includes an outlet line 62 communicating with clutch control valve 54 and a variable flow orifice 64 against which the pump outlet flow produces the pressure for operating the clutch-control valve 54.

Clutch control valve 54 includes a double-landed spool 70 having two lands 72 and 74 and a reduced diameter stem 76 therebetween translatable in a bore 78 provided in housing 20. A spring 80 is provided in a spring chamber 82 at the right end of bore 78 as viewed in FIG. 2 to engage the right side 84 of land 72 as viewed in FIG. 2 to normally bias spool 70 towards a chamber 87 communicating outlet conduit 62 with the left side 86 of land 74 upstream of variable flow orifice 64. In the position shown, lands 72 and 74 close first and second ports 90 and 92 provided in bore 78 to communicate with pressure line 56 and exhaust line 58, respectively. A third port 94 located intermediate ports 90 and 92 communicates the piston chamber 52 through clutch line 59 with a chamber 77 provided about reduced diameter stem 76 between the left and right sides 85 and 88 of lands 72 and 74. A fourth port 96 in bore 78 communicates fluid leaking into spring chamber 82 past land 72 to exhaust line 58. These ports and connections thereto permit a pressure decrease to be effected in piston chamber 52 when spring 80 biases spool 70 to close port 90 while opening port 92 so that piston chamber 52 communicates with exhaust line 58 and a pressure increase is effected in chamber 52 when the pressure communicated to chamber 87 biases spool 70 to close port 92 while opening port 90 so that chamber 52 communicates with pressure source 57.

Pump means 60 is of the internal-external gear positive displacement type and includes an externally-toothed pinion gear 100 meshed with an internally-toothed ring gear 102 within a pump cavity 103 provided in a pump housing 104 secured to radial wall 32 to rotate with shaft 18. While the pump housing is aligned to rotate coaxially with pinion 100, ring gear 102 rotates about an axis that while parallel to the axis of pinion 100 is offset therefrom. Extending axially into pump 104 are a pair of pump ports 106 and 108. As shown schematically in FIG. 2, port 106 is connected between a first pair of check valves 110 and 112 in a first branch 114 of conduit 62, and port 108 is connected between a second pair of check valves 116 and 118 in a second branch 120, both branches 114 and 120 being connected to a sump 122. Pinion 100 is secured to shaft 16 and rotates with a shaft extension 123 which rotates in a central bore 124 in pump housing 104. A pump crescent 127 extends axially from pump housing 104 between gears 100 and 102 to provide a pressure seal therebetween that permits pumping between ports 106 and 108 by engaging fluid at one of these ports and releasing fluid at the other.

Check valves 110, 112, 116 and 118 cooperate to provide alternate pumping paths through pump means 60 from sump 122 to outlet line 62. One path is provided when pumping from port 106 to port 108 and includes open check valves 110 and 118, check valves 112 and 116 being closed by the pressure differential between the pressure at port 108 and sump 122. The other path is provided when pumping from port 108 to port 106 and includes open check valves 116 and 112, check valves 110 and 118 being closed by the pressure at port 106. Which of these two paths is used for pumping depends on whether pinion 100 rotates faster or slower than pump housing 104 or the direction of relative rotation therebetween which in turn depends on whether shaft 16 rotates faster or slower than shaft 18 or the direction of rotation therebetween. For example, with shaft 16 driving shaft 18 in the clockwise direction as viewed in FIG. 2 and clutch 14 continuously slipping so that shaft 18 rotates slower than shaft 16, fluid is engaged at port 106 and released at port 108. With shaft 18 driving shaft 16 in the clockwise direction so that shaft 18 rotates faster than shaft 16, fluid is pumped from port 108 to port 106. Similarly, when shaft 16 drives shaft 18 in the counterclockwise direction so that shaft 18 is slower than shaft 16, fluid is pumped from port 108 to port 106, and when shaft 18 drives shaft 16 in the counterclockwise direction, shaft 18 rotating faster than shaft 16, fluid is pumped from port 106 to port 108.

In operation of the clutch control apparatus 12 regardless of the direction of rotation of shafts 16 and 18 and which shaft does the driving, pump means 60 develops a flow proportional to the speed differential between shafts 16 and 18, this flow causing flow orifice 64 to develop a pressure signal in chamber 87 proportional to the speed differential. This varying pressure is applied to side 86 of spool land 74 for opposing the normal bias supplied by spring 80 in side 84 of land 72 to position spool 70 in bore 78.

The flow area through orifice 64 and the spring load of spring 80 are selected to position spool 70 such that lands 72 and 74 thereof close ports 90 and 92 when a desired speed differential exists between shafts 16 and 18. As the actual speed differential increases above the desired speed differential, the pressure developed by flow orifice 64 increases to move spool 70 to the right as viewed in FIG. 2 with the result that left side 85 of land 72 opens port 90 to apply fluid pressure to clutch piston chamber 52 from pressure line 56 through port 90, chamber 77, port 94 and clutch line 59 while port 92 is closed by land 74. The increased pressure in the clutch piston chamber 52 causes clutch apply piston 44 to increase the torque capacity of clutch 14, thereby reducing the speed differential between shafts 16 and 18 until the flow provided by pump means 60 through orifice 64 reduces the pressure signal on side 86 of land 74 to where spring 80 moves spool 70 to the left as viewed in FIG. 2 to close port 90. Alternatively, when the actual speed differential between shafts 16 and 18 falls below the desired speed differential, the force applied by spring 80 against side 84 of the land 72 overcomes the reduced pressure on side 86 of land 74 resulting from the reduced flow through orifice 64 so that right side 87 of land 74 opens port 92 to exhaust the pressure in piston chamber 52 to exhaust line 58 through clutch line 59, chamber 77 and port 92 while land 70 closes port 90 until the speed differential has increased to the desired differential where the pressure in side 86 is sufficient to position spool 70 to close port 92. For a spring 80 of a given spring load, the flow area through orifice 64 may be increased or decreased to increase or decrease the speed differential being controlled between shafts 16 and 18. Thus, by decreasing the flow area through orifice 64, less flow produced by a smaller speed differential is required to produce a pressure cooperating with spring 80 to position spool 70 to close ports 90 and 92. Conversely, by opeing flow orifice 64, greater pump low produced by a greater speed differential is required to produce a pressure signal that cooperates with spring 80 to close ports 90 and 92.

Clutch control apparatus 12 operating as described controls the capacity of clutch 14 to maintain a substantially constant speed differential as small as a few rpm between the input and output shafts irrespective of the magnitude or range of input torques and irrespective of the range of input speeds over which the torques are transmitted. Moreover, the flow area through orifice 64 may be adjusted by screw 65 to allow one shaft to rotate at one speed while the other shaft rotates at any lesser speed including zero.

While having described one embodiment of the present invention, it is understood that the specific terms and examples are employed in a descriptive sense only and not for the purpose of limitation. Other embodiments of the invention, modifications thereof and alternatives thereto may be used. I therefore aim in the appended claims to cover such modifications and changes as fall within the true spirit and scope of my invention.

What I claim as new and desire to secure by Letters Patent of the United States is:

1. Torque transmission apparatus comprising, in combination:
   a housing;
   first and second shaft means rotatably supported in said housing;
   slip clutch means for providing a continually slipping connection between said first and second shaft means, said slip clutch means including a chamber for fluid and having a continuously variable torque transmitting capacity controlled by the pressure of the fluid within said chamber;
   pump means having a driving member operatively connected to said first shaft means and a reaction member operatively connected to said second shaft means for providing a fluid pressure varying with the speed differential between said shaft means;
   a source of fluid under pressure separate from said pump means,
   valve means comprising a bore and a fluid exhaust conduit in said housing, said bore having one end in communication with said varying fluid pressure from said pump means and further having first, second and third axially spaced valve ports, said first valve port being in communication with said separate source of fluid pressure, said between valve port being in communication with said chamber and said third valve port being in communication with said fluid exahust conduit, said value means further comprising an axially reciprocable spool in said bore, said spool having two axially spaced lands and a reduced diameter center portion, one of said lands blocking said first valve port with said reduced diameter center portion providing communication between said second and third valve ports when said spool moves toward said open end of said bore, the other of said lands blocking said third valve port with said reduced diameter center portion providing communication between said first and second valve ports when said spool moves toward the other end of said bore, said one land blocking said third valve port and said other land blocking said first valve port when the spool is intermediate said open and said other end of said bore; said valve means further comprising a spring in said bore between said spool and said other end of said bore, said spring biasing said spool toward said open end of said bore.

* * * * *